(12) United States Patent
Stirner

(10) Patent No.: US 12,311,405 B2
(45) Date of Patent: May 27, 2025

(54) METHOD AND DEVICE FOR PRODUCING A POWDER COATING MELT

(71) Applicant: Coperion GmbH, Stuttgart (DE)

(72) Inventor: Thorsten Stirner, Konigsbach-Stein (DE)

(73) Assignee: Coperion GmbH, Stuttgart (DE)

( * ) Notice: Subject to any disclaimer, the term of this patent is extended or adjusted under 35 U.S.C. 154(b) by 0 days.

(21) Appl. No.: 17/112,723

(22) Filed: Dec. 4, 2020

(65) Prior Publication Data

US 2021/0170442 A1    Jun. 10, 2021

(30) Foreign Application Priority Data

Dec. 6, 2019   (EP) ..................................... 19214205

(51) Int. Cl.
  *B05D 3/00*   (2006.01)
  *B05C 19/06*  (2006.01)
  *B05D 3/04*   (2006.01)

(52) U.S. Cl.
  CPC .............. *B05D 3/002* (2013.01); *B05C 19/06* (2013.01); *B05D 3/0426* (2013.01)

(58) Field of Classification Search
  CPC ........ B05D 3/002; B05D 3/0426; B05C 19/06
  See application file for complete search history.

(56) References Cited

U.S. PATENT DOCUMENTS

2009/0226711 A1* 9/2009 Silvi ....................... B29C 70/58
                                                                 428/419

FOREIGN PATENT DOCUMENTS

| CH | 694015 | A5 | 6/2004 | | |
| CN | 106378919 | A | 2/2017 | | |
| DE | 4028567 | A1 | 3/1992 | | |
| EP | 2896661 | A1 | 7/2015 | | |
| EP | 3144352 | A1 | 3/2017 | | |
| JP | 06312438 | A * | 11/1994 | ............. | B29C 45/72 |
| WO | WO-2013030226 | A2 * | 3/2013 | ............. | B29C 48/02 |

OTHER PUBLICATIONS

English machine translation of JP-06312438-A.*
EP 19 21 4205 Search Report dated May 6, 2020.

* cited by examiner

*Primary Examiner* — Robert S Walters, Jr.
(74) *Attorney, Agent, or Firm* — Dinsmore & Shohl LLP

(57) ABSTRACT

In a method and a device for producing a powder coating melt, firstly a first powder coating melt is produced from a powder coating premix by a screw machine. Powder coating particles are supplied to the first powder coating melt. Then a second powder coating melt is produced by mixing the first powder coating melt and the powder coating particles by the screw machine. This allows a simple, gentle and efficient recycling of powder coating particles, in particular of so-called off-spec powder coating particles.

25 Claims, 5 Drawing Sheets

METHOD AND DEVICE FOR PRODUCING A POWDER COATING MELT

CROSS-REFERENCES TO RELATED APPLICATIONS

This application claims the priority of European Patent Application, Serial No. 19 214 205.7, filed Dec. 6, 2019, the content of which is incorporated herein by reference in its entirety as if fully set forth herein.

FIELD OF THE INVENTION

The invention concerns a method and a device for producing a powder coating melt.

To produce powder coating powder, a powder coating premix is prepared by means of a screw machine and the prepared powder coating melt is extruded. The extruded powder coating melt is then cooled and crushed into powder coating powder. The powder coating powder is then separated into a useful part and a fines part. The useful part, which comprises powder coating particles with the desired particle dimension or grain size, is used for powder coating while the fines part, which comprises smaller powder coating particles, is not suitable for powder coating. In addition, during powder coating, powder coating particles which are unsuitable for powder coating are deposited for example in particle filters of spray booths. Such powder coating particles or fine powder coating particles are known as fines or super-fines.

SUMMARY OF THE INVENTION

The invention is based on an object of creating a method for producing a powder coating melt which, in a simple, flexible and efficient manner, allows a recycling of powder coating particles. In particular so-called off-spec powder coating particles shall be recycled. Off-spec powder coating particles are powder coating particles, which are outside of a desired specification with respect to at least one characteristic, such as colour and/or particle size for example.

This object is achieved by a method for producing a powder coating melt, comprising the following steps:
provision of a screw machine,
production of a first powder coating melt from a powder coating premix by means of the screw machine,
supply of powder coating particles into the first powder coating melt present in the screw machine, and
production of a second powder coating melt by mixing the first powder coating melt and the powder coating particles by means of the screw machine.

According to the invention, it has been found that the powder coating particles to be recycled are produced from a homogenised powder coating melt or powder coating powder, and thus for recycling no longer need be subjected to intensive homogenisation. Accordingly, in the method according to the invention, firstly a first powder coating melt is produced from a powder coating premix by means of the screw machine. The powder coating particles to be recycled are then supplied to this first powder coating melt and then merely mixed with the first powder coating melt by means of the screw machine, so that a second powder coating melt is produced which contains the powder coating particles to be recycled. The second powder coating melt is then discharged or extruded from the screw machine and processed further into powder coating powder in the usual fashion. The powder coating particles to be recycled are in particular fine powder coating particles.

The first powder coating melt is preferably fully prepared and suitable for further processing into powder coating powder. The first powder coating melt is in particular plasticised and homogenised. The powder coating particles are in particular mixed homogenously in and/or melted on, preferably completely melted, after being supplied to the first powder coating melt and before its discharge. Due to the complete melting of the powder coating particles, in particular so-called off-spec powder coating particles can be recycled.

Because the powder coating particles are merely mixed into the first powder coating melt, production or preparation of the first powder coating melt from the powder coating premix is not adversely affected. The first powder coating melt may be produced in the usual quality and/or with the usual rate. Then the powder coating particles can be mixed into the first powder coating melt in a simple and flexible fashion. The supplied quantity of powder coating particles may vary within wide ranges, in particular between zero and an intake limit Intensive homogenisation of the powder coating particles which have been mixed in, in particular melted on or melted, is not necessary by means of the screw machine.

The screw machine is in particular configured as a multi-shaft screw machine, preferably as a two-shaft screw machine. The multi-shaft screw machine in particular comprises at least two treatment element shafts which can be driven in rotation in the same direction. The at least two treatment element shafts are preferably configured to inter-mesh tightly.

A method, wherein the supplied powder coating particles each have a maximum particle dimension $A_{max}$, wherein for at least 50%, in particular for at least 70%, and in particular for at least 90% of the supplied powder coating particles: $A_{max} \leq 100$ µm, in particular $A_{max} \leq 90$ µm, in particular $A_{max} \leq 80$ µm, and in particular $A_{max} \leq 60$ µm, guarantees a simple, flexible and efficient recycling of the powder coating particles. Because of the maximum particle dimension $A_{max}$, the powder coating particles are not suitable for use as powder coating powder but must be recycled. The supplied powder coating particles can easily be mixed into the first powder coating melt. The percentage figure designates the number of particles or the mass proportion. The maximum particle dimension $A_{max}$ designates in particular a maximum grain diameter.

A method, wherein the supplied powder coating particles each have a maximum particle dimension $A_{max}$, wherein for at least 50%, in particular for at least 70%, and in particular for at least 90% of the supplied powder coating particles: $A_{max} \geq 1$ µm, in particular $A_{max} \geq 5$ µm, and in particular $A_{max} \geq 10$ µm, guarantees a simple, flexible and efficient recycling of the powder coating particles. Because of the maximum particle dimension $A_{max}$, the powder coating particles can easily be supplied and mixed into the first powder coating melt. The percentage figure designates the number of particles or the mass proportion. The maximum particle dimension $A_{max}$ designates in particular a maximum grain diameter.

A method, wherein the powder coating particles are melted before the second powder coating melt is discharged from the screw machine, guarantees a simple, flexible and efficient recycling of the powder coating particles. The powder coating particles are in particular completely melted after being supplied into the first powder coating melt and before being discharged through the discharge opening. Because the powder coating particles are melted before discharge through the discharge opening of the screw machine, the powder coating particles are optimally bonded into the powder coating melt so that the second powder coating melt is homogenous. The supply of powder coating particles lowers the outlet temperature of the second powder coating melt. This is advantageous for cooling and hardening of the second powder coating melt after discharge.

A method, wherein the powder coating particles are supplied downstream of a plasticisation zone, in particular downstream of a homogenisation zone, of the screw machine, guarantees a simple, flexible and efficient recycling of the powder coating particles. The screw machine comprises, successively in a conveying direction, an intake zone, a plasticisation zone and a homogenisation zone. In the intake zone, the powder coating premix is supplied to the screw machine and conveyed to the plasticisation zone. In the plasticisation zone, the powder coating premix is melted and then homogenised in the homogenisation zone. The powder coating particles are supplied downstream of the plasticisation zone so that plasticisation of the powder coating premix is only affected, or adversely affected, as little as possible. Preferably, the powder coating particles are supplied downstream of the homogenisation zone, so that the powder coating premix is plasticised and the first powder coating melt homogenised optimally before the powder coating particles are supplied. Thus there is substantially no adverse effect on the preparation of the powder coating premix into the first powder coating melt, so that the first powder coating melt can be prepared with a high quality and at a high throughput rate. In the plasticisation zone, the screw machine preferably comprises kneading elements, in particular kneading discs. This guarantees rapid and efficient plasticisation of the powder coating premix. In the homogenisation zone, the screw machine preferably comprises kneading elements, in particular kneading discs. This guarantees an efficient homogenisation of the polymer melt.

A method, wherein the powder coating particles are supplied in a supply zone of the screw machine which is arranged downstream of a plasticisation zone and upstream of a mixing zone, guarantees a simple, flexible and efficient recycling of the powder coating particles. In the supply zone, the powder coating particles are supplied to the screw machine. Here, preferably, a supply device is used which in particular is connected to the screw machine. The supply zone is arranged downstream of the plasticisation zone in a conveying direction, so that the powder coating particles are supplied to the plasticised powder coating premix or powder coating melt. Preferably, the powder coating particles are supplied downstream of a homogenisation zone, so that the powder coating particles are supplied to the fully prepared polymer melt, and there is substantially no adverse effect on the plasticisation and homogenisation of the powder coating premix. Downstream of the supply zone, a mixing zone is provided in which the supplied powder coating particles are mixed into the first powder coating melt, so that before the discharge there are now no free powder coating particles, i.e. no powder coating particles which are not bonded into the powder coating melt. The mixing zone is preferably configured and/or arranged such that firstly, mixing of the supplied powder coating particles before discharge is guaranteed, and secondly the shear forces acting on the powder coating particles before discharge are as low as possible. The mixing zone comprises at least one conveying element, in particular at least one screw element and/or at least one kneading element, in particular at least one kneading disc. The mixing zone comprises for example several conveying elements arranged in succession, so that the first powder coating melt and the supplied powder coating particles are conveyed together long enough for the powder coating particles to be mixed and/or melted, preferably completely melted. The mixing zone comprises for example several kneading elements arranged in succession, in particular several kneading discs. This improves mixing. Preferably, at least one conveying element and at least one kneading element are arranged in succession in the mixing zone. The at least one conveying element initially conveys the first powder coating melt with the supplied powder coating particles away from the supply zone so that no build-up occurs in the supply zone. By means of the at least one kneading element, the supplied powder coating particles are mixed into the first powder coating melt over a short length.

A method, wherein the powder coating particles are supplied to the screw machine by means of a supply device which in particular comprises a dosing unit and/or a supply screw machine, guarantees a simple, flexible and efficient recycling of the powder coating particles. The supply device allows an automated supply of powder coating particles. The supply device in particular comprises a gravimetric dosing unit and/or volumetric dosing unit and/or a supply screw machine. The supply screw machine is in particular configured as a side feed device. The supply screw machine in particular comprises two screw shafts which in particular can be driven in rotation in the same direction. The supply screw machine is connected to the screw machine. For this, the screw machine comprises a housing with a supply opening through which the supply screw machine supplies the powder coating particles to the screw machine. The supply device in particular is coolable. Preferably, a dosing unit and/or a supply screw machine is coolable. The supply device preferably comprises a cooling device for cooling.

A method, wherein the powder coating particles are provided by a separating device, guarantees a simple, flexible and efficient recycling of the powder coating particles. During production of powder coating powder, the hardened powder coating melt is ground into a powder coating powder which is then separated into at least two particle size fractions. Separation takes place by means of a separating device which is formed for example as a screen or cyclone. The powder coating particles which are separated by means of the separating device and are unsuitable for powder coating are returned to the screw machine where they are supplied to the first powder coating melt, for example by means of a supply device. The powder coating particles which are not usable for powder coating are thus supplied directly for recycling.

A method, wherein the powder coating particles are supplied by means of a supply screw machine, which is in particular cooled, guarantees a simple, flexible and efficient recycling of the powder coating particles. The supply screw machine guarantees a simple and even supply of the powder coating particles into the powder coating melt present in the screw machine. The supply screw machine comprises at least one screw shaft, preferably at least two screw shafts. The supply screw machine is preferably connected to the side of the screw machine, so that the powder coating particles are supplied to the screw machine through a side supply opening.

A method, wherein the supply screw machine is connected to the screw machine by means of a supply insert, wherein the supply insert is in particular cooled, guarantees a simple, flexible and efficient recycling of the powder coating particles. The supply insert is connected to a housing of the supply screw machine and opens into a housing opening of a housing of the screw machine, so as to form a supply opening for supply of the powder coating particles. The supply insert is detachably connected to the housing of the supply screw machine and/or to the housing of the screw machine. The supply insert can be exchanged or removed for cleaning. Preferably, the supply insert comprises a flange and a supply channel component attached thereto. The supply insert preferably comprises at least one cooling element. The at least one cooling element is preferably configured as a cooling channel. Preferably, the flange and/or the supply channel component can be cooled by means of a cooling fluid. For this, the flange and/or the supply channel component comprises at least one cooling element, in particular at least one cooling channel. The at least one cooling channel is formed in the flange and/or the supply channel component. Cooling reduces, in particular largely prevents, adhesion by melting of the powder coating particles in the supply insert and/or in the supply screw machine. For example, a respective cooling channel is formed in the flange and in the supply channel component so that the flange and the supply channel component may be cooled separately and/or jointly. By means of a control device, the corresponding cooling circuits can be controlled and operated separately from each other and/or jointly. For example, the cooling circuit for the flange is constantly operated, and the cooling circuit for the supply channel component is operated depending on certain operating states, such as for example during a stoppage of the screw machine or when the temperature exceeds a predefined level in the region of the supply channel component.

A method, wherein a housing and/or at least one screw shaft and/or an inlet hopper of the supply screw machine is cooled, guarantees a simple, flexible and efficient recycling of the powder coating particles. By cooling the inlet hopper and/or the housing and/or the at least one screw shaft, an adhesion by melting of the powder coating particles on the inlet hopper and/or on an inner wall of the housing and/or on the at least one screw shaft is reduced or substantially prevented. At least one cooling device, which is configured for example as a compressed air cooling device and/or a water cooling device, serves for cooling. Preferably, at least one cooling channel is formed in an inlet hopper and/or a housing of the supply screw machine and/or in the at least one screw shaft. A cooling fluid flows through the cooling channel for cooling.

A method, wherein the powder coating particles are supplied by means of a dosing unit, wherein the dosing unit is in particular cooled, guarantees a simple, flexible and efficient recycling of the powder coating particles. The dosing unit allows an exact dosage of the powder coating particles so that the dosed powder coating particles can be melted and homogeneously mixed in the powder coating melt. The dosing unit is designed as a gravimetric dosing unit or a volumetric dosing unit. Due to the cooling of the dosing unit an adhesion by melting of the powder coating particles is reduced or essentially prevented. In particular, a container and/or a discharge pipe of the dosing unit is cooled. At least one cooling device serves for cooling, which is for example designed as a compressed air cooling device and/or a water cooling device. Preferably, the dosing unit and the supply screw machine have a common cooling or rather cooling device.

The invention is furthermore based on an object of providing a device for producing a powder coating melt which, in a simple, flexible and efficient manner, allows a recycling of powder coating particles.

This object is achieved by a device for producing a powder coating melt, comprising
  a screw machine with
    a first supply opening for supplying a powder coating premix, and
    a second supply opening arranged downstream for supplying powder coating particles,
  a supply device for supplying the powder coating particles to the screw machine through the second supply opening.

The advantages of the device according to the invention correspond to the advantages of the method according to the invention. The device may in particular also be refined with the features of the method for producing a powder coating melt according to the invention.

The screw machine is in particular configured as a multi-shaft screw machine, preferably as a two-shaft screw machine. The screw machine comprises a housing, at least one housing bore formed in the housing, and at least one treatment element shaft mounted rotatably in the at least one housing bore. When configured as a multi-shaft screw machine, at least two mutually penetrating housing bores are formed in the housing, in which at least two treatment element shafts are arranged. The at least two treatment element shafts can preferably be driven in rotation in the same direction. The at least two treatment element shafts are in particular configured to intermesh tightly.

The device preferably comprises a control device for controlling the screw machine and/or the supply device. The supply device comprises in particular a cooling device. The cooling device serves in particular for cooling a dosing unit and/or a supply screw machine. In particular, a cooling device for cooling the supply device may be controlled by means of the control device.

A device configured such that the second supply opening is arranged between a plasticisation zone, in particular a homogenisation zone, and a discharge opening, in particular a mixing zone, of the screw machine, guarantees a simple, flexible and efficient recycling of the powder coating particles. The screw machine comprises, successively in a conveying direction, an intake zone, a plasticisation zone and a homogenisation zone. Because the second supply opening is arranged between the plasticisation zone and the discharge opening, the powder coating particles can easily be mixed into the plasticised powder coating premix or powder coating melt. Preferably, the second supply opening is arranged between the homogenisation zone and the discharge opening. Through this, the powder coating particles are supplied to the fully prepared powder coating melt, so that the preparation of the powder coating melt from the powder coating premix is not substantially influenced or adversely affected. Preferably, downstream of the second supply opening, the screw machine comprises a mixing zone arranged upstream of the discharge opening. The screw machine comprises at least one conveying element and/or at least one kneading element in the mixing zone. Preferably, the screw machine comprises at least one conveying element and at least one kneading element in succession in the mixing zone.

A device configured such that the supply device comprises a dosing unit and/or a supply screw machine, wherein the dosing unit and/or the supply screw machine are in particular coolable by means of a cooling device, guarantees a simple, flexible and efficient recycling of the powder coating particles. The supply screw machine comprises a housing in which at least one housing bore is formed. The housing has a supply opening into which in particular an inlet hopper opens. At least one screw shaft is arranged rotatably in the at least one housing bore. Preferably, at least two mutually penetrating housing bores are formed in the housing. At least two screw shafts are arranged rotatably in the two housing bores. The supply screw machine is in particular configured as a side feed machine. The supply screw machine is in particular connected to the side of a housing of the screw machine. The supply screw machine and/or the dosing unit can preferably be cooled by means of at least one cooling device, for example a compressed air cooling device and/or a water cooling device. The at least one cooling device serves for cooling the inlet hopper and/or the housing and/or the at least one screw shaft of the supply screw machine and/or a container and/or a discharge pipe of the dosing unit. Preferably, the supply device comprises a gravimetric or volumetric dosing unit which supplies the powder coating particles to the supply screw machine. The powder coating particles are preferably provided by a separating device. The inlet hopper is preferably configured with double walls. Because of the double-walled design, the inlet hopper comprises in particular a cooling channel. The cooling channel is in particular part of at least one cooling device. A cooling fluid, for example compressed air or water, can flow through the cooling channel. The cooled inlet hopper prevents adhesion of the powder coating particles.

A device configured such that the supply device comprises a supply insert for connection to the screw machine, wherein the supply insert is in particular coolable, guarantees a simple, flexible and efficient recycling of the powder coating particles. This supply device preferably comprises a supply screw machine which is connected to the screw machine by means of the supply insert. The supply insert comprises in particular a flange and a supply channel component attached thereto. The supply insert comprises at least one cooling element, in particular at least one cooling channel. The at least one cooling channel serves for cooling the flange and/or the supply channel component. The flange is in particular attached to a housing of the supply screw machine so that the supply channel component extends into a housing opening of the housing of the screw machine.

Further advantages, features and details of the invention arise from the following description of several exemplary embodiments.

DESCRIPTION OF THE PREFERRED EMBODIMENTS

Figure 1:
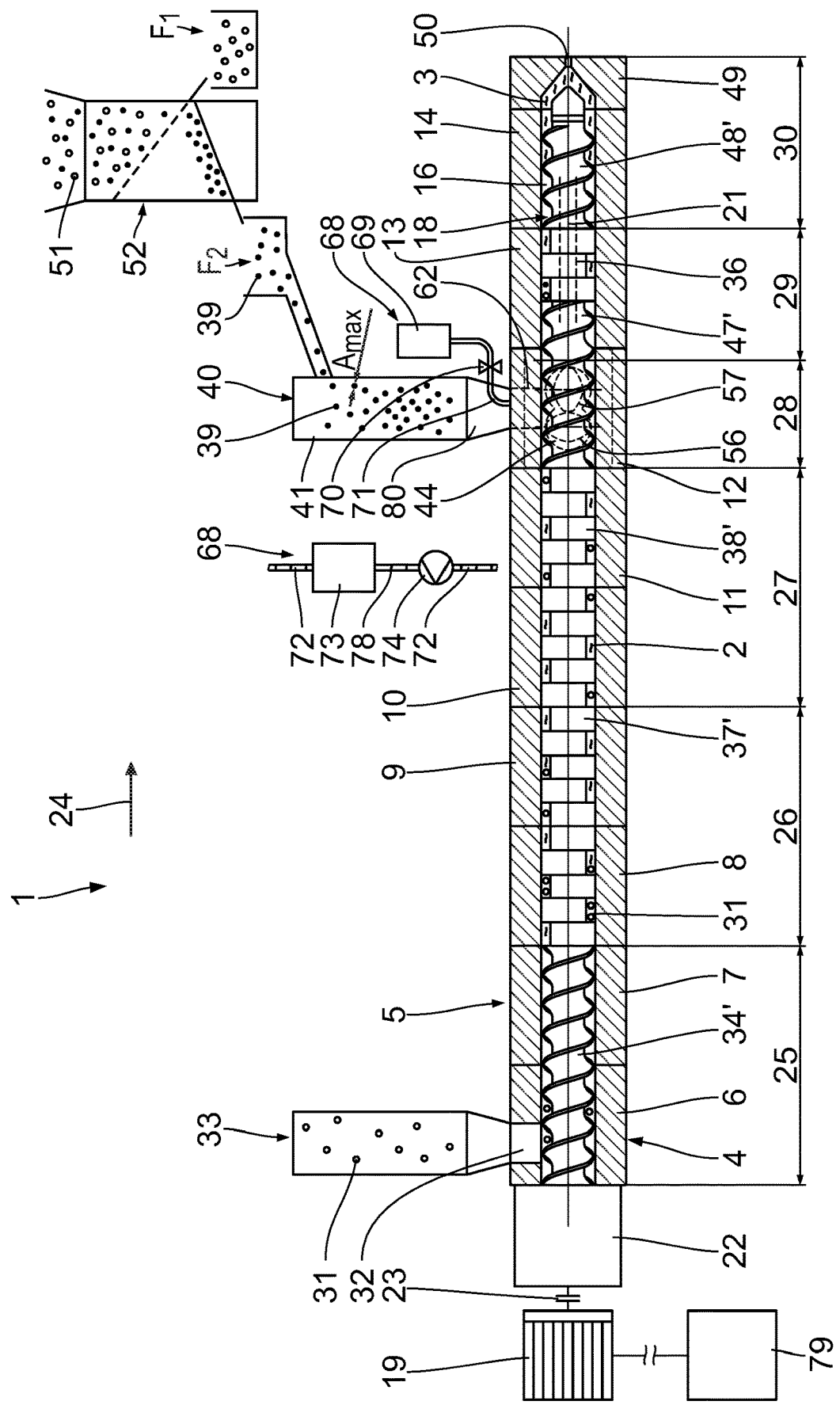
FIG. 1 shows in partly sectional view, a device for producing a powder coating melt according to a first exemplary embodiment with a multi-shaft screw machine for preparation of a powder coating premix, and a supply device connected thereto with a supply screw machine for the supply of powder coating particles.
Figure 2:
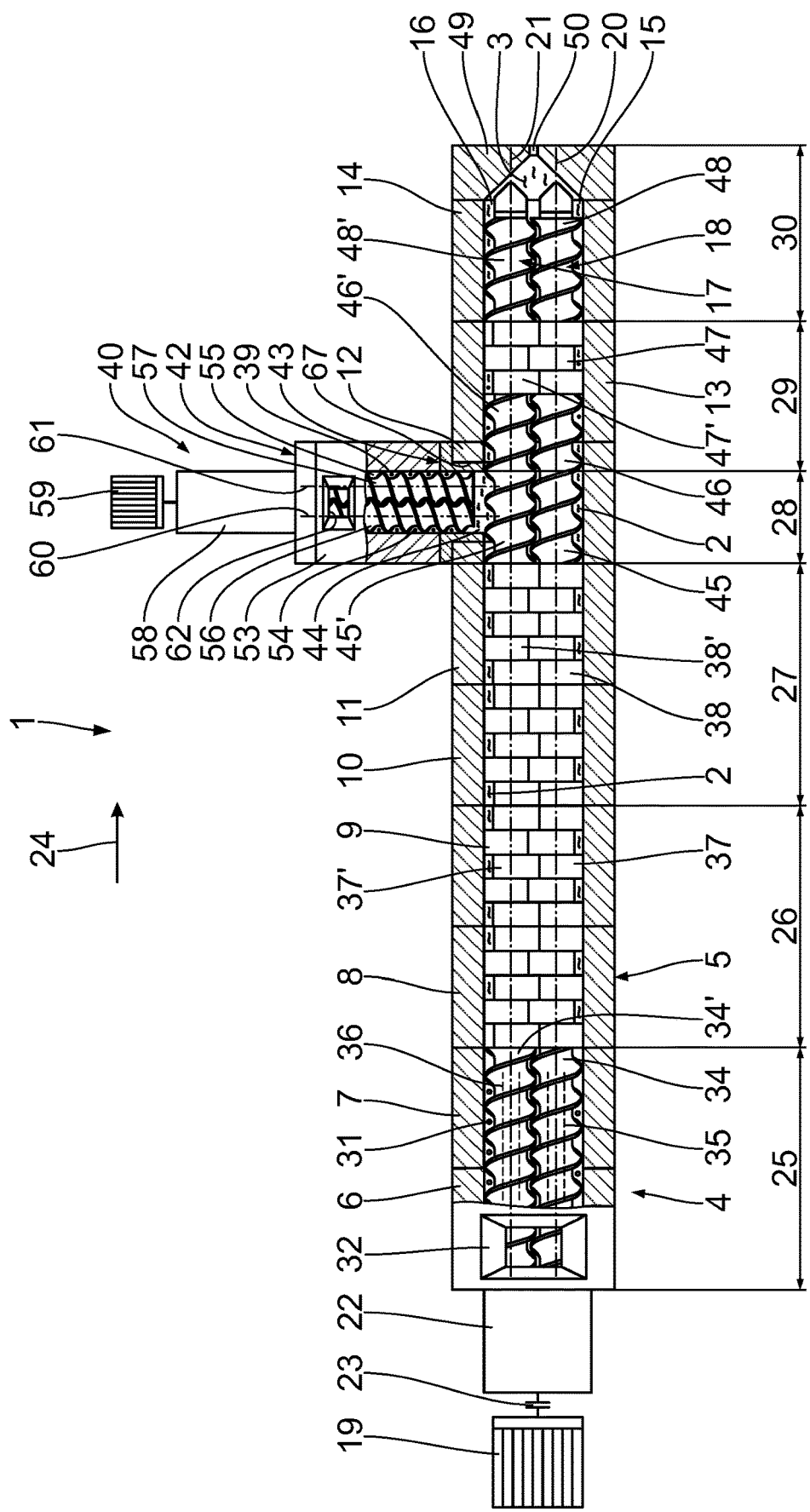
FIG. 2 shows a partly sectional, top view of the device in FIG. 1.
Figure 3:
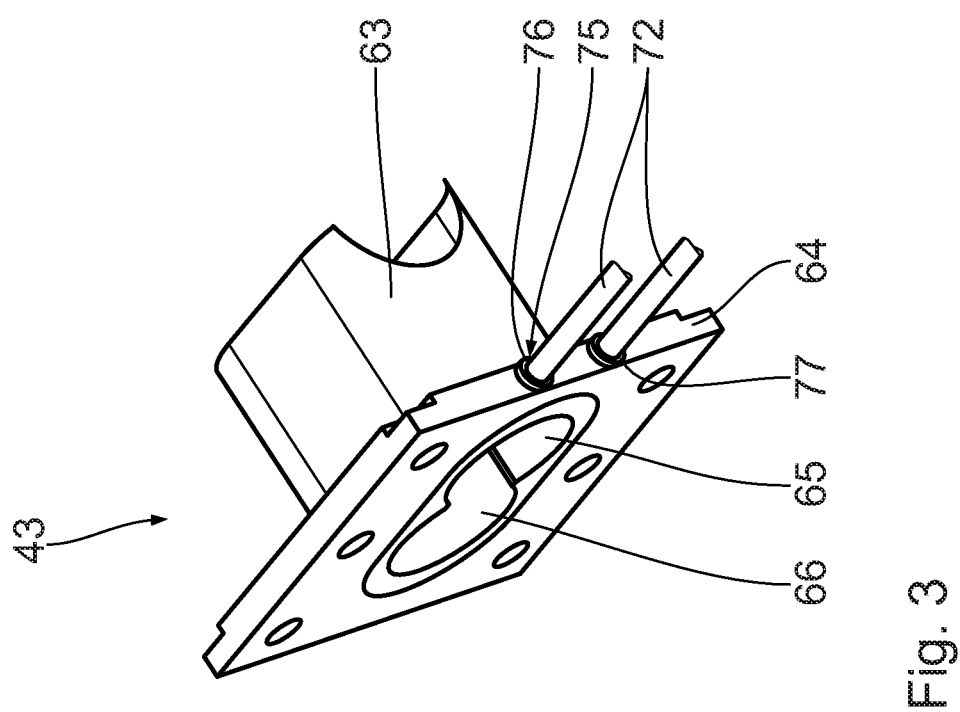
FIG. 3 shows a perspective view of a coolable supply insert for connection of this supply screw machine to the multi-shaft screw machine.

A first exemplary embodiment of the invention is described below with reference to FIGS. 1 to 3. The device 1 shown in the figures serves for production of a powder coating melt 2, 3.

The device 1 comprises a multi-shaft screw machine 4 which has a housing 5 made from several successively arranged housing portions 6 to 14. The housing portions 6 to 14 are connected together to form the housing 5. Two mutually parallel and mutually penetrating housing bores 15, 16, which in cross-section take the form of a horizontal figure of eight, are formed in the housing 5. Two treatment element shafts 17, 18 are arranged concentrically in the housing bores 15, 16 and can be driven in rotation about respective rotational axes 20, 21 by a drive motor 19. A branching gear mechanism 22 is arranged between the treatment element shafts 17, 18 and the drive motor 19. A coupling 23 is in turn arranged between the drive motor 19 and the branching gear mechanism 22. The treatment element shafts 17, 18 can be driven in rotation in the same direction, i.e. in the same rotational directions, about the rotational axes 20, 21 by the drive motor 19.

The multi-shaft screw machine 4 comprises, successively in a conveying direction 24, an intake zone 25, a plasticisation zone 26, a homogenisation zone 27, a supply zone 28, a mixing zone 29 and a discharge zone 30.

A powder coating premix 31 is supplied to the multi-shaft screw machine 4 in the intake zone 25. For this, in the first housing portion 6, a first supply opening 32 is formed through which the powder coating premix 31 can be introduced into the housing bores 15, 16. To provide the powder coating premix 31, the device 1 comprises a first supply device 33 which is connected to the first supply opening 32. The first supply device 33 comprises for example a gravimetric dosing unit.

In the intake zone 25, the supplied powder coating premix 31 is conveyed to the plasticisation zone 26. In the intake zone 25, the treatment element shafts 17, 18 comprise screw elements 34, 34' which are arranged rotationally fixedly on assigned shafts 35, 36 and serve to convey the powder coating premix 31.

The supplied powder coating premix 31 is melted in the plasticisation zone 26. In the plasticisation zone 26, kneading elements 37, 37' are arranged rotationally fixedly on the shafts 35, 36 for melting and dispersal. The kneading elements 37, 37' are configured as kneading discs. Preferably, in the plasticisation zone 26, kneading blocks comprising several integrally formed kneading discs are arranged on the shafts 35, 36.

The powder coating premix 31, which has been plasticised or melted in the plasticisation zone 26, is conveyed to the homogenisation zone 27. In the homogenisation zone 27, the plasticised powder coating premix 31 is homogenised into a first powder coating melt 2. In the homogenisation zone 27, the plasticised powder coating premix 31 is intensively mixed so that the first powder coating melt 2 is fully prepared at the downstream end of the homogenisation zone 27. In the homogenisation zone 27, kneading elements 38, 38' are arranged rotationally fixedly on the shafts 35, 36. The kneading elements 38, 38' are in particular configured as kneading discs. Preferably, kneading blocks, which are formed from several integrally formed kneading discs, are arranged in the homogenisation zone 27.

In the supply zone 28, powder coating particles 39 are supplied to the fully prepared powder coating melt 2. The powder coating particles 39 are not suitable for powder coating and must be recycled. The supply of the powder coating particles 39 to the first powder coating melt 2 reduces its temperature. This is advantageous for further processing of the powder coating melt 2.

To supply the powder coating particles 39, the device 1 comprises a second supply device 40. The second supply device 40 comprises a gravimetric dosing unit 41, an inlet hopper 80, a supply screw machine 42, and a supply insert 43. The supply screw machine 42 is connected to the side of the housing 5 by means of the supply insert 43, so that a second supply opening 44 is formed in the housing 5 in the supply zone 28. The second supply opening 44 opens into the housing bores 15, 16, or into the housing bore 16. The metering unit 41 is connected to the supply screw machine 42 by means of the inlet hopper 80.

In the supply zone 28, screw elements 45, 45' are rotationally fixedly arranged on the shafts 35, 36. The screw elements 45, 45' convey the first powder coating melt 2 with the supplied powder coating particles 39 to the mixing zone 29.

In the mixing zone 29, the supplied powder coating particles 39 are mixed into the first powder coating melt 2 and melted therein. For this, screw elements 46, 46' and kneading elements 47, 47' are arranged successively and rotationally fixedly on the shafts 35, 36 in the mixing zone 29. The screw elements 46, 46' serve to convey the first powder coating melt 2 with the supplied powder coating particles 39 away from the second supply opening 44, so that no build-up occurs in the supply zone 28. By means of the kneading elements 47, 47', the powder coating particles 39 are mixed into the first powder coating melt 2 as gently as possible and without intensive shearing, so that a second powder coating melt 3 is produced. The kneading elements 47, 47' are preferably configured as kneading discs. Kneading blocks for example, which are formed from integrally interconnected kneading discs, are arranged in the mixing zone 29.

After the powder coating particles 39 have been mixed in the mixing zone 29, the second powder coating melt 3 is discharged in the discharge zone 30. In the discharge zone 30, screw elements 48, 48' are rotationally fixedly arranged on the shaft 35, 36 for discharging the second powder coating melt 3. On the last housing portion 14, a nozzle plate 49 is arranged which terminates the housing 5 and forms a discharge opening 50. Depending on the design of the nozzle plate 49, the discharge opening 50 may be arranged vertically so that discharge takes place horizontally, or arranged horizontally so that discharge takes place vertically. Vertical discharge is in particular pressureless. FIGS. 1 and 2 show a horizontal discharge. The second powder coating melt 3 is discharged through the discharge opening 50. The second powder coating melt 3 is fully prepared so it now contains no free powder coating particles 39. The powder coating particles 39 are mixed in and melted by the time of discharge.

After discharge of the second powder coating melt 3, this is cooled in conventional fashion. The cooled and hardened powder coating melt 3 is then ground into powder coating powder 51.

For separating the powder coating powder 51, the device 1 comprises a separating device 52. The separating device 52 separates the supplied powder coating powder 51 into a useful fraction $F_1$ and a recycling fraction $F_2$. The useful fraction $F_1$ is suitable for powder coating. In contrast, the recycling fraction $F_2$ contains the powder coating particles 39 which are not suitable for powder coating. The powder coating particles 39 are provided to the second supply device 40 from the separating device 51.

The powder coating particles 39 each have a maximum particle dimension $A_{max}$, wherein for at least 50%, in particular for at least 70%, and in particular for at least 90%: $A_{max} \leq 100$ μm, in particular $A_{max} \leq 80$ μm, and in particular $A_{max} \leq 60$ μm. Furthermore, for at least 50%, in particular for at least 70%, and in particular for at least 90% of the powder coating particles 39: $A_{max} \geq 1$ μm, $A_{max} \geq 5$ μm, and in particular $A_{max} \geq 10$ μm.

Firstly, the powder coating particles 39 reach the gravimetric metering unit 41. The gravimetric metering unit 41 is connected to the supply screw machine 42 and supplies the powder coating particles 39 thereto.

The supply screw machine 42 is configured as a two-shaft side feed machine. The supply screw machine 42 comprises a housing 53 with mutually penetrating housing bores 54, 55 formed therein which in cross-section take the form of a horizontal figure of eight. Two screw shafts 56, 57 are arranged in the housing bores 54, 55, and can be driven in rotation in the same direction about associated rotational axes 60, 61 by a drive motor 59 via a branching gear mechanism 58. A supply opening 62, into which the metering unit 41 opens above the inlet hopper 80, is formed in the housing 53.

The supply screw machine 42 is connected to the multi-shaft screw machine 4 by means of the supply insert 43. The supply insert 43 comprises a supply channel component 63 and a flange 64 attached thereto. The supply insert 43 is attached to the end of the housing 53 by means of the flange 64 such that bores 65, 66 formed in the supply channel component 63 align with the housing bores 54, 55. The bores 65, 66 formed in the supply channel component 63 are mutually penetrating and in cross-section take the form of a horizontal figure of eight. The supply channel component 63 is arranged in an associated housing opening 67 of the housing 5, so that the bores 65, 66 open into the housing bores 15, 16 or the housing bore 16 and form the second supply opening 44.

The supply insert 43 comprises a cooling channel 75. The cooling channel 75 has an inlet opening 76 and an outlet opening 77 for a cooling fluid 78. The cooling channel 75 extends through the flange 64 and through the supply channel component 63.

To cool the second supply device 40, the device 1 comprises a cooling device 68. The cooling device 68 comprises a compressed air supply unit 69 with a valve 70. A compressed air line 71 leads from the compressed air supply unit 69 via the valve 70 into the supply opening 62. By means of compressed air which is supplied to the supply opening 62 via the compressed air line 71, a compressed air stream can be created from the supply opening 62 through the housing bores 54, 55 up to the second supply opening 44, so that firstly a slight positive pressure is generated which prevents an outflow of waste heat from the multi-shaft screw machine 4, for example when the multi-shaft screw machine 4 has stopped, and secondly achieves a cooling of the housing 53 and the screw shafts 56, 57.

The cooling device 68 furthermore comprises a cooling line 72, a heat exchanger 73 and a pump 74. The cooling line 72 is connected to the heat exchanger 73 and pump 74, and attached to the inlet opening 76 and outlet opening 77 of the cooling channel 75. The pump 74 pumps the cooling fluid 78, for example water, through the cooling line 72 to the cooling channel 75 and from there to the heat exchanger 73, so that heat is extracted from the supply insert 43 and the supply insert 43 is cooled. The heated cooling fluid 78 is cooled again in the heat exchanger 73.

The inlet hopper 80 is formed with double walls so that the inlet hopper 18 forms a cooling channel. The cooling channel is part of the cooling device 68 and is cooled for example by means of compressed air or water.

The cooling device 68 reduces, and preferably prevents, an adhesion by melting of the powder coating particles 39 on the inlet hopper 80, the inner wall of the housing 53, the screw shafts 56, 57 and/or the supply insert 43.

The device 1 comprises a control device 79. The control device 79 controls the drive motor 19, the supply devices 33, 40 and the cooling device 68. Because the powder coating particles 39 are supplied to the fully prepared first powder coating melt 2, the preparation of the first powder coating melt 2 is not influenced or adversely affected. Since the powder coating particles 39 have already been prepared, these need merely be mixed into the first powder coating melt 2. Mixing can take place gently. Since preparation of the first powder coating melt 2 is not substantially adversely affected, the quantity of supplied powder coating particles 39 may be varied within broad limits Thus the powder coating particles 39 may be recycled flexibly depending on the quantity occurring. The powder coating particles 39 are recycled gently since there is no second intensive mixing and homogenising. This is advantageous since the powder coating particles 39 are more reactive than the powder coating premix 31, and thus a deterioration in the quality of the second powder coating melt 3 is avoided. The powder coating particles 39 are thus recycled in a simple, flexible and efficient fashion.

Figure 4:
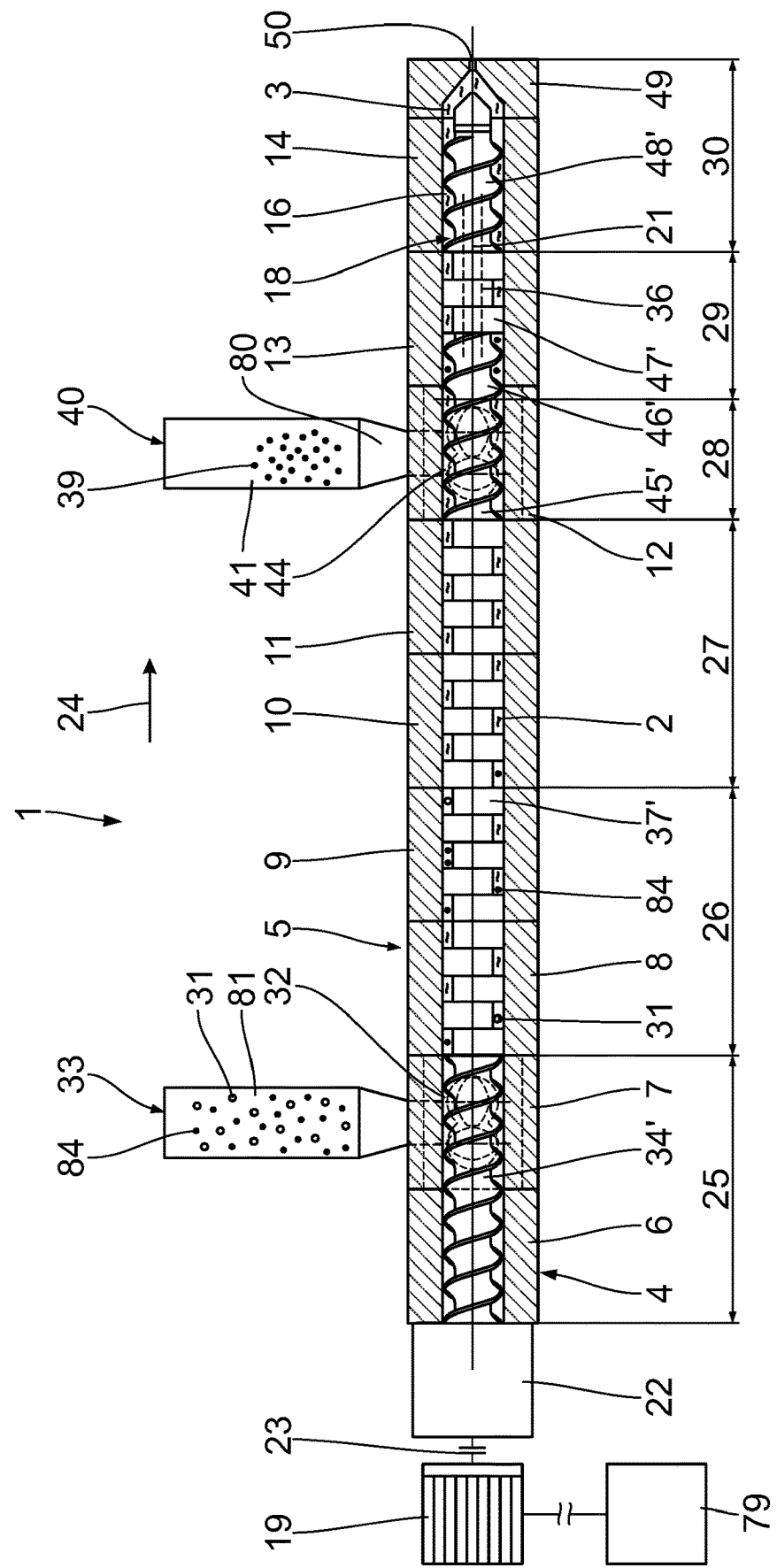
FIG. 4 shows in partly sectional view, a device for producing a powder coating melt according to a second exemplary embodiment.
Figure 5:
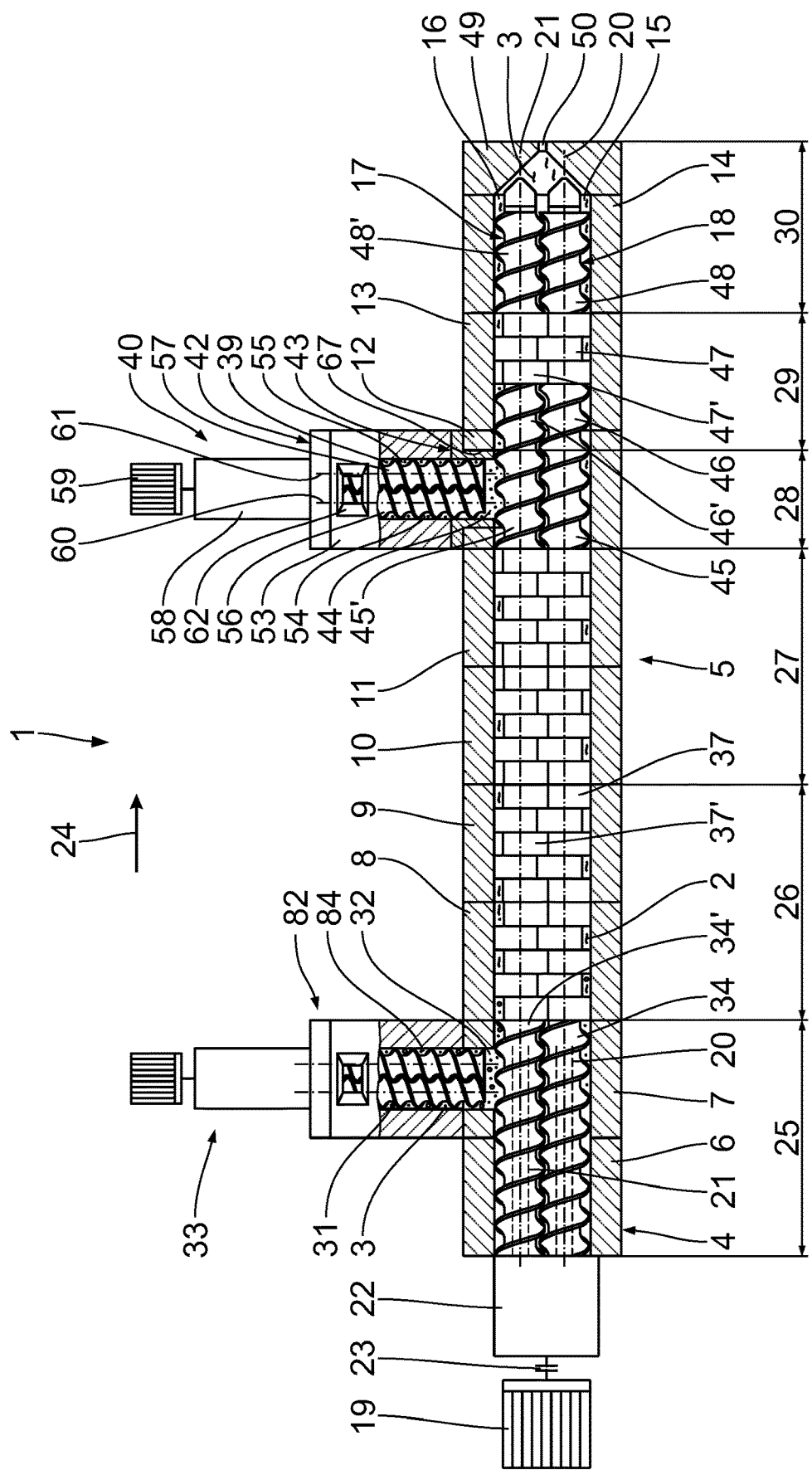
FIG. 5 shows a partly sectional, top view of the device in FIG. 4.

A second exemplary embodiment of the invention is described below with reference to FIGS. 4 and 5. In contrast to the above-mentioned exemplary embodiment, the device 1 has a first supply device 33, which comprises a gravimetric dosing unit 81 and a supply screw machine 82. The dosing unit 81 opens into the supply screw machine 82. The supply screw machine 82 is connected directly, i.e. without a supply insert, into the intake zone 25 on the housing 5 so that a first supply opening 32 opens into the housing bores 15, 16 or the housing bore 16 on the side of the intake zone 25. The dosing unit 81 and the supply screw machine 82 are formed similarly to the dosing unit 41 and supply screw machine 42.

The supply device 33 serves to supply powder coating particles 84 which are unsuitable for powder coating. The powder coating particles 84 are supplied to the intake zone 25 together with the powder coating premix 31, melted together with the powder coating premix 31 in the plasticisation zone 26, and then homogenised in the homogenisation zone 27 into the first powder coating melt 2. The quantity of powder coating particles 84 which can be supplied with the powder coating premix 31 is determined by the subsequent plasticisation and homogenisation. Thus powder coating particles 84 may be supplied in a quantity which does not adversely affect the preparation of the powder coating premix 31, for example does not cause a reduction in quality and/or throughput rate. The supply and recycling of the powder coating particles 39 take place similarly to the first exemplary embodiment. With respect to the further construction and further function of the device 1, reference is made to the previous exemplary embodiment.

In general, the following applies:

In the mixing zone 29, exclusively screw elements 46, 46' may be arranged. In this case, the mixing zone 29 must be sufficiently long to mix in and in particular melt the supplied powder coating particles 39. The length of the mixing zone 29 may be shortened by the arrangement of kneading elements 47, 47' in the mixing zone 29.

Powder coating particles 39 with any grain size or any grain diameter may be supplied downstream of the plasticisation zone 26, in particular the homogenisation zone 27. Preferably, fine powder coating particles are supplied. The necessary length of the mixing zone 29 depends on the viscosity of the powder coating melt 2, the melt temperature, the rotation speed of the treatment element shafts 17, 18, and the supplied quantity of powder coating particles 39. The powder coating particles 39 may also be supplied to the middle of the homogenisation zone 27, as long as this does not adversely affect the preparation of the powder coating melt 2.

A comparatively small quantity of powder coating particles 84 may also be supplied to the intake zone 25 as long as this does not adversely affect the preparation of the powder coating premix 31.

Since the quantity of supplied powder coating particles 39 may vary within broad limits, it is also possible to supply the powder coating particles 39, which have just been produced in the separating device 52, directly into the supply screw machine 42, i.e. without the interposition of a dosing unit, for example by means of a pneumatic conveyor.

The powder coating particles 39 may also be supplied to the second supply device 40 via so-called big bags.

The cooling by means of compressed air may take place in particular during a stoppage of the multi-shaft screw machine 4. The stoppage is detected for example from the rotation speed of the drive motor 19 or from control signals present in the control device 79.

What is claimed is:

1. A method for producing a powder coating melt, comprising the following steps:
   providing a screw machine with a housing, a first supply opening for supplying a powder coating premix into the housing, and a second supply opening arranged downstream for supplying powder coating particles into the housing,
   producing a first powder coating melt from the powder coating premix by means of the screw machine,
   supplying the powder coating particles into the first powder coating melt present in the screw machine by means of a supply device for supplying the powder coating particles to the screw machine through the second supply opening,
   wherein the supply device comprises a supply screw machine,
   wherein the supply screw machine has at least two screw shafts,
   wherein the supply screw machine is configured as a side feed machine and is connected to a side of the housing of the screw machine,
   wherein the supply device comprises a supply insert,
   wherein the supply screw machine is connected to the screw machine by means of the supply insert,
   wherein the supply insert comprises a supply channel component and a flange attached thereto,
   wherein the flange is attached to a housing of the supply screw machine and the supply channel component is arranged in an associated housing opening of the housing of the screw machine,
   cooling the supply screw machine by means of a cooling device,
   wherein the supply insert is cooled by means of the cooling device, and
   producing a second powder coating melt by mixing the first powder coating melt and the powder coating particles by means of the screw machine, wherein bores are formed in the supply channel component and the at least two screw shafts of the supply screw machine extend into said bores.

2. The method according to claim 1, wherein the supplied powder coating particles each have a maximum particle dimension $A_{max}$, wherein for at least 50% of the supplied powder coating particles: $A_{max} < 100\,\mu m$.

3. The method according to claim 1, wherein
the supplied powder coating particles each have a maximum particle dimension $A_{max}$, wherein for at least 50% of the supplied powder coating particles: $A_{max} > 1$ µm.

4. The method according to claim 1, wherein the powder coating particles are melted before the second powder coating melt is discharged from the screw machine.

5. The method according to claim 1, wherein the powder coating particles are supplied downstream of a plasticization zone of the screw machine.

6. The method according to claim 1, wherein
the powder coating particles are supplied in a supply zone of the screw machine which is arranged downstream of a plasticization zone and upstream of a mixing zone.

7. The method according to claim 1, wherein the supply device comprises a dosing unit.

8. The method according to claim 1, wherein the powder coating particles are provided by a separating device.

9. The method according to claim 1, wherein
at least one of the housing, at least one screw shaft and an inlet hopper of the supply screw machine is cooled.

10. The method according to claim 1, wherein the powder coating particles are supplied by means of a dosing unit.

11. The method according to claim 10, wherein the dosing unit is cooled.

12. The method according to claim 1, wherein at least one of an inlet hopper, the housing and at least one screw shaft of the supply screw machine is cooled by means of the cooling device.

13. The method according to claim 1, wherein the supply insert comprises a cooling channel which is connected to the cooling device.

14. The method according to claim 13, wherein the cooling channel extends through the flange and through the supply channel component of the supply insert.

15. The method according to claim 1, wherein said bores are mutually penetrating.

16. The method according to claim 1, wherein the supply insert forms the second supply opening.

17. A device for producing a powder coating melt, comprising
a screw machine with
a housing,
a first supply opening for supplying a powder coating premix into the housing, and
a second supply opening arranged downstream for supplying powder coating particles into the housing, and
a supply device for supplying the powder coating particles to the screw machine through the second supply opening, wherein the supply device comprises a supply screw machine,
wherein the supply screw machine has at least two screw shafts,
wherein the supply screw machine is configured as a side feed machine and is connected to a side of the housing of the screw machine,
wherein the supply device comprises a supply insert,
wherein the supply screw machine is connected to the screw machine by means of the supply insert,
wherein the supply insert comprises a supply channel component and a flange attached thereto,
wherein the flange is attached to a housing of the supply screw machine and the supply channel component is arranged in an associated housing opening of the housing of the screw machine,
a cooling device for cooling the supply screw machine, wherein the supply insert is cooled by means of the cooling device, wherein bores are formed in the supply channel component and the at least two screw shafts of the supply screw machine extend into said bores.

18. The device according to claim 17, wherein
the second supply opening is arranged between a plasticization zone and a discharge opening of the screw machine.

19. The device according to claim 17, wherein the supply device comprises a dosing unit.

20. The device according to claim 19, wherein the dosing unit is cooled by means of the cooling device.

21. The device according to claim 17, wherein at least one of an inlet hopper, the housing and at least one screw shaft of the supply screw machine is cooled by means of the cooling device.

22. The device according to claim 17, wherein the supply insert comprises a cooling channel which is connected to the cooling device.

23. The device according to claim 22, wherein the cooling channel extends through the flange and through the supply channel component of the supply insert.

24. The device according to claim 17, wherein the supply insert forms the second supply opening.

25. A device for producing a powder coating melt, comprising
a screw machine with
a housing,
a first supply opening for supplying a powder coating premix into the housing, and
a second supply opening arranged downstream for supplying powder coating particles into the housing, and
a supply device for supplying the powder coating particles to the screw machine through the second supply opening, wherein the supply device comprises a supply screw machine,
wherein the supply screw machine has at least two screw shafts,
wherein the supply screw machine is configured as a side feed machine and is connected to a side of the housing of the screw machine,
wherein the supply device comprises a supply insert,
wherein the supply screw machine is connected to the screw machine by means of the supply insert,
wherein the supply insert comprises a supply channel component and a flange attached thereto,
wherein the flange is attached to a housing of the supply screw machine and the supply channel component is arranged in an associated housing opening of the housing of the screw machine,
a cooling device for cooling the supply screw machine, wherein the supply insert is cooled by means of the cooling device, wherein bores are formed in the supply channel component and said bores are mutually penetrating.

* * * * *